United States Patent
Becquet

(10) Patent No.: US 7,038,420 B2
(45) Date of Patent: May 2, 2006

(54) METHOD OF REGULATING AN ELECTRIC MOTOR AND CORRESPONDING ELECTRIC MOTOR

(75) Inventor: Valéry Becquet, Molliens Dreuil (FR)

(73) Assignee: Johnson Controls Automotive Electronics, Osny (FR)

( * ) Notice: Subject to any disclaimer, the term of this patent is extended or adjusted under 35 U.S.C. 154(b) by 0 days.

(21) Appl. No.: 10/492,296

(22) PCT Filed: Oct. 9, 2002

(86) PCT No.: PCT/FR02/03434

§ 371 (c)(1),
(2), (4) Date: Apr. 12, 2004

(87) PCT Pub. No.: WO03/034582

PCT Pub. Date: Apr. 24, 2003

(65) Prior Publication Data

US 2004/0239277 A1     Dec. 2, 2004

(30) Foreign Application Priority Data

Oct. 15, 2001   (FR) .................... 01 13275

(51) Int. Cl.
*G05B 11/28* (2006.01)
(52) U.S. Cl. .......... 318/599; 318/470; 318/471; 318/603; 318/604; 361/204
(58) Field of Classification Search ........ 318/470, 318/471, 599, 603, 604; 361/204
See application file for complete search history.

(56) References Cited

U.S. PATENT DOCUMENTS

| | | | | |
|---|---|---|---|---|
| 4,143,706 A | * | 3/1979 | Schnaibel et al. | 165/202 |
| 4,381,480 A | * | 4/1983 | Hara et al. | 318/471 |
| 4,694,228 A | * | 9/1987 | Michaelis | 388/819 |
| 4,801,503 A | * | 1/1989 | Jennings | 428/399 |
| 4,806,832 A | * | 2/1989 | Muller | 388/833 |
| 4,829,433 A | * | 5/1989 | Nakano et al. | 701/51 |
| 5,719,519 A | * | 2/1998 | Berringer | 327/423 |
| 5,757,172 A | * | 5/1998 | Hunsdorf et al. | 323/277 |
| 6,055,960 A | | 5/2000 | Marumoto et al. | 123/399 |
| 6,064,187 A | * | 5/2000 | Redl et al. | 323/285 |
| 6,091,887 A | * | 7/2000 | Dieterle et al. | 388/811 |
| 6,216,814 B1 | | 4/2001 | Fujita et al. | 180/422 |
| 6,246,197 B1 | * | 6/2001 | Kurishige et al. | 318/432 |

FOREIGN PATENT DOCUMENTS

DE      196 08 756 A1      9/1996

OTHER PUBLICATIONS

Patent Abstracts of Japan, 11122965, Yaskawa Electric Corp; publication date Apr. 30, 1999; 1 pg.

* cited by examiner

Primary Examiner—Rita Leykin
(74) Attorney, Agent, or Firm—Foley & Lardner LLP

(57) ABSTRACT

A method of regulating an electric motor, regulation being implemented with a loop of gain less than unity as a function of a divergence between a setpoint signal for an operating parameter of the motor and a measured value of the same operating parameter of the electric motor, the divergence being taken into account only if said divergence is greater than a predetermined threshold whenever the measured value is greater than the setpoint signal.

8 Claims, 1 Drawing Sheet

METHOD OF REGULATING AN ELECTRIC MOTOR AND CORRESPONDING ELECTRIC MOTOR

RELATED APPLICATIONS

The present application is a U.S. national phase filing of PCT/FR02/03434 filed Oct. 9, 2002, which claims priority to French Application No. 0113275 filed Oct. 15, 2001, the disclosures of which are hereby incorporated by reference.

FIELD

The present invention relates to a method of regulating an electric motor suitable for use, for example, in a motor vehicle fan unit for driving a cooling fan for the internal combustion engine of a vehicle.

BACKGROUND

It is known for such electric motors to be controlled as a function of a temperature measured on the internal combustion engine, preferably in association with regulation of the real speed of the electric motor as measured by means of suitable sensors, such as Hall effect sensors.

In known methods, regulation is generally performed using a control loop operating on a difference between a setpoint signal representative of an operating parameter of the electric motor and a measured value of said parameter. The reaction speed of the regulation loop depends on its gain which is generally less than unity. Unfortunately, the setpoint value for a fan unit can vary frequently, in particular in stop-go traffic in which the driver alternates between accelerating and slowing down. Existing systems are then not very satisfactory for regulating the speed of the fan unit.

In a regulation loop that possesses low gain, the time needed for reaching the value desired for the operating parameter is too long compared with the frequency at which the setpoint is changed, such that the fan unit does not reach the setpoint before the setpoint changes.

Conversely, in a regulation loop that possesses high gain, the fan unit reaches the setpoint, passing in alternation through values that are less than and greater than the setpoint with sudden changes of speed that are particularly noisy and that are perceived by the user of the vehicle and are detrimental to user comfort.

SUMMARY

The invention seeks to propose a method enabling regulation to be performed sufficiently quickly, while nevertheless limiting the risk of instability in the speed of the electric motor.

One embodiment provides a method of regulating an electric motor, regulation being implemented using a loop of gain less than unity, as a function of a divergence calculated on the basis of a difference between a setpoint signal representative of an operating parameter of the motor and a measured value of the same operating parameter, the divergence being taken into account when the measured value is greater than the setpoint signal only if the divergence is greater than a predetermined threshold.

Thus, when the speed of the fan unit exceeds the setpoint value by a divergence that is less than the threshold, the regulation loop ceases to be effective. The number of changes of speed is thus minimized and vehicle user comfort is improved.

Advantageously, the gain is equal to one-fourth, and the predetermined threshold is equal to 2% of the setpoint signal.

This provides an optimum compromise between the speed at which the operating parameter adapts to the setpoint and stability of electric motor speed.

Furthermore, the cost of Hall effect sensors is relatively high. The use of Hall effect sensors thus constitutes a major drawback in the field of motor equipment where questions of unit cost price are of major importance because of the increasing amount of equipment that needs to be installed on a vehicle in order to improve user comfort.

In a particular embodiment, the setpoint is a pulse voltage setpoint having a duty ratio representative of a percentage of a nominal speed of rotation of the electric motor, the setpoint being converted to correspond to a mean voltage prior to calculating the divergence between the setpoint and the measured value.

The Hall effect sensors are thus replaced by a voltage sensor which is less expensive.

Also preferably, the method includes steps of measuring current at the terminals of the electric motor and of feeding the electric motor in such a manner as to maintain the measured current at a value that is less than or equal to a predetermined current threshold.

This makes it possible to limit the torque delivered by the motor when a relatively large opposing torque is applied to the outlet shaft thereof, in particular during starting or in the event of the fan being blocked, accidentally. The risk of damaging the electric motor by overloading it is thus minimized.

One embodiment provides an electric motor associated with a regulation loop of gain less than unity and with means for implementing a method presenting one of the above characteristics.

BRIEF DESCRIPTION OF THE DRAWING

Other characteristics and advantages of the invention appear on reading the following description of a particular and non-limiting embodiment of the invention.

Reference is made to the sole accompanying figure which is a block diagram of the control system for an electric motor.

MORE DETAILED DESCRIPTION

Figure 1:
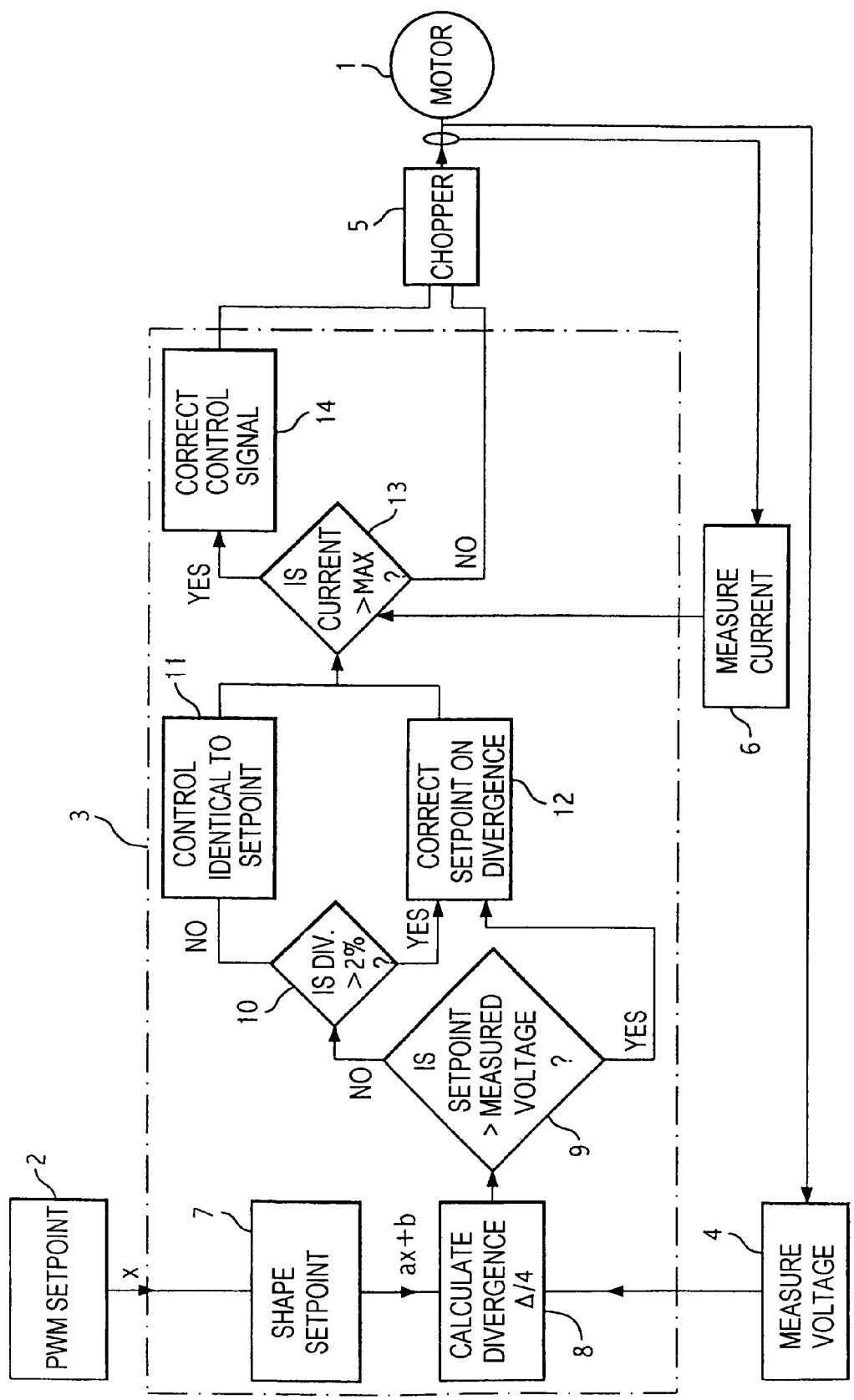

An exemplary embodiment is described herein in the context of an application to cooling the heat engine (not shown) of a motor vehicle.

The method of regulation is used for controlling an electric motor 1 for rotating a fan (not shown) for blowing a stream of air to cool the engine.

The electric motor 1 is controlled in this circuit by means of a microprocessor on the basis of a setpoint established as a function of the temperature of the engine. The temperature of the engine is either measured or else determined in predictive manner, e.g. by taking account of other operating parameters of the engine such as vehicle speed, engine speed, etcetera. The setpoint is preferably delivered in the form of a pulse signal X of the pulse width modulated (PWM) type, presenting a predetermined ratio of pulse duration over period duration so as to correspond to a percentage of the nominal speed of rotation of the electric motor 1.

The setpoint signal X is injected into a regulation loop comprising a module 3 (outlined by a chain-dotted box) for digitally correcting the setpoint signal as a function of the difference between the setpoint signal and the voltage measured by a voltage sensor 4 across the terminals of the electric motor 1 in order to generate a control signal which is applied to the motor power supply circuit, e.g. by means of a chopper 5 which determines the width of the voltage pulses fed to the motor.

For correction purposes, the setpoint signal X is initially converted by a correction module 7 using coefficients so as to put the signal into the form aX+b corresponding to a mean power supply voltage setpoint. These coefficients are determined in such a manner that when the setpoint represents a ratio of 16%, the voltage setpoint corresponds to the minimum voltage enabling the electric motor 1 to be driven, i.e. in general, a voltage of 4 volts (V), and when the setpoint signal has a ratio of 80%, the setpoint corresponds to the nominal voltage of the electric motor, i.e. 12 V or 13.5 V depending on the type of vehicle.

The difference between the measured voltage 4 and the voltage setpoint derived from conversion of the setpoint signal is then divided by four (8) in order to obtain the divergence that is used for correcting the control signal. The gain of the regulation loop is thus equal to 0.25. In the example shown which includes a digital correction module, division by four is performed very simply by shifting.

When the measured voltage is less than the calculated mean voltage, the divergence is added to the setpoint in order to determine how the power supply voltage is to be controlled.

When the measured voltage is greater than the calculated mean voltage (9), the divergence is compared with the setpoint 10. If the divergence is less than 2% of the setpoint, then the control signal is identical to the setpoint (11). If the divergence is more than 2% of the setpoint, then the control signal is generated by reducing the setpoint by the value of the divergence (12).

Whatever the control signal that is generated, the motor current as measured by a sensor 6 is compared with the applied control signal 12. When the measured current is greater than the control signal, the control signal is corrected (14) in order to bring the current to a value that is below a limit threshold. When the control signal is applied by means of a chopper, the current measurement is the pulse percentage of the motor current control signal, multiplied by measurement gain. This gain enables the limit threshold to be determined.

Naturally, the invention is not limited to the embodiment described and variant embodiments can be applied thereto without going beyond the ambit of the invention as defined by the claims.

In particular, the setpoint signal may correspond to an operating parameter of the electric motor other than voltage, for example speed of rotation, even though present-day speed sensors are more expensive than voltage sensors, as emphasized above.

Although the invention is described with reference to a system that has a digital correction module, it can also be implemented with an analog system.

In addition, numerical values are given merely by way of example and can be modified, in particular as a function of the characteristics of the electric motor and/or of the system with which it is associated.

What is claimed is:

1. A method of regulating an electric motor (1), regulation being implemented using a loop of gain less than unity, as a function of a divergence calculated on the basis of a difference between a setpoint threshold representative of an operating parameter of the motor and a measured value for the same operating parameter of the electric motor, wherein the divergence is taken into account when any one of the measured value is lower than the setpoint threshold, and when the measured value is greater than the setpoint threshold and the divergence is greater than a predetermined divergence threshold, but the divergence is not taken into account when the measured value is greater than the setpoint threshold and the divergence is smaller than the predetermined divergence threshold.

2. A method according to claim 1, wherein the gain is equal to 0.25 and the predetermined divergence threshold is equal to 2% of the signal.

3. A method according to claim 1, wherein the setpoint signal is a pulse voltage setpoint having a duty ratio representative of a percentage of a nominal speed of rotation of the electric motor (1), and in that the setpoint signal is converted so as to correspond to a mean voltage prior to calculating the divergence between the setpoint signal and the measured value.

4. A method according to claim 1, further comprising measuring a current of the electric motor (1); and powering the electric motor in such a manner as to maintain the motor current at a value that is less than or equal to a predetermined current threshold.

5. A vehicle system, comprising:
an electric motor; and
a control circuit, the control circuit configured to regulate the electric motor using a loop of gain less than unity, as a function of a divergence calculated on a basis of a difference between a setpoint threshold representative of an operating parameter of the motor and a measured value for the operating parameter, the control circuit being further configured to take the divergence into account when any one of the measured value is lower than the setpoint threshold, and when the measured value is greater than the setpoint threshold and the divergence is greater than a predetermined divergence threshold, but the divergence is not taken into account when the measured value is greater than the setpoint signal and the divergence is smaller than the predetermined divergence threshold.

6. A system according to claim 5, wherein the gain is equal to about 0.25 and the predetermined divergence threshold is equal to about 2% of the signal.

7. A system according to claim 5, wherein the setpoint signal is a pulse voltage setpoint having a duty ratio representative of a percentage of a nominal speed of rotation of the electric motor (1), and in that the setpoint signal is converted so as to correspond to a mean voltage prior to calculating the divergence between the setpoint signal and the measured value.

8. A system according to claim 5, wherein the control circuit is further configured to measure the current of the electric motor (1) and power the electric motor in such a manner as to maintain the motor current at a value that is less than or equal to a predetermined current threshold.

* * * * *